US009650095B2

(12) United States Patent
Mize, Jr.

(10) Patent No.: US 9,650,095 B2
(45) Date of Patent: May 16, 2017

(54) SADDLEBAG SUPPORT BRACKET

(76) Inventor: Frank Lanier Mize, Jr., Birmingham, AL (US)

( * ) Notice: Subject to any disclaimer, the term of this patent is extended or adjusted under 35 U.S.C. 154(b) by 745 days.

(21) Appl. No.: 13/616,932

(22) Filed: Sep. 14, 2012

(65) Prior Publication Data
US 2013/0062381 A1 Mar. 14, 2013

Related U.S. Application Data

(60) Provisional application No. 61/534,466, filed on Sep. 14, 2011.

(51) Int. Cl.
*B62J 9/00* (2006.01)
*B62J 7/00* (2006.01)

(52) U.S. Cl.
CPC .. *B62J 9/00* (2013.01); *B62J 7/00* (2013.01)

(58) Field of Classification Search
CPC .................. B62J 7/00–7/08; B62J 9/00–9/008
USPC ........................................................ 224/413
See application file for complete search history.

(56) References Cited

U.S. PATENT DOCUMENTS

| 2,636,652 | A | * | 4/1953 | Foringer | 224/413 |
| 2,776,790 | A | * | 1/1957 | Zbikowski | 224/443 |
| 2008/0083801 | A1 | * | 4/2008 | Knoch et al. | 224/413 |

OTHER PUBLICATIONS

Unknown author of 'Bag Iron (formerly known as Butt's Baggers Installation Video'. On <youtube.com> [online]. Published on Apr. 4, 2011 by user jebduncan; Retrieved from the Internet: <https://www.youtube.com/watch?v=B-ehCzfcxLI>; Retrieved on May 16, 2015.*

* cited by examiner

*Primary Examiner* — Brian D Nash
(74) *Attorney, Agent, or Firm* — Patent Service Associates; Lyman Smith

(57) ABSTRACT

A support bracket fits and properly supports the saddlebags of the HARLEY-DAVIDSON® HERITAGE SOFTAIL® leather saddlebags. The support bracket can be made from a solid steel material to provide bag-specific foundational support members in key areas while allowing the bag to function as originally designed. The support bracket utilized specially designed T-bar supports and an outer lid support rail to uniquely and positively reach up underneath the original and existing leather folds designed into every factory Heritage bag. The support bracket can install quickly, typically within 10 minutes or less. The support bracket requires no motorcycle or saddlebag alterations, no glues, and no product assembly. The support bracket utilizes T-bars at the front and rear ends thereof, along with an outside lid support rail to positively and solidly, yet discretely, contact with parts of the existing and unaltered saddlebag which are outside of view once the lid is closed.

11 Claims, 3 Drawing Sheets

# SADDLEBAG SUPPORT BRACKET

CROSS-REFERENCE TO RELATED APPLICATION

This application claims the benefit of priority of U.S. provisional application No. 61/534,466, filed Sep. 14, 2011, the contents of which are herein incorporated by reference.

BACKGROUND OF THE INVENTION

The present invention relates to saddlebag support brackets and, more particularly, to a one-piece solid steel bag support system that fits and properly supports the saddlebags of the HARLEY-DAVIDSON® HERITAGE SOFTAIL® leather saddlebags.

Current HARLEY-DAVIDSON® saddlebags offer limited support, even with alterations to the motorcycle or existing original saddlebags. Other products are often made of multiple metal parts, or plastic which are often subject to heat, cold, moisture, vibrations, loosening and failure.

Some systems are "liners" only, and as such, add their own weight to the interior of each bag but offer little to no secondary support. Many other products require gluing, hole punching, riveting, or other alterations to the original bag as it was produced. Many other products accidentally reduce capacity as they, themselves, occupy space inside each bag when they are installed.

Many systems try, in different ways, to aesthetically improve a bag's appearance. They are, in some cases, successful in helping the appearance, but do not actually accomplish much real support. HARLEY-DAVIDSON® introduced, in the 2011 catalog, a design that requires attachment to the frame. The HARLEY-DAVIDSON® design, however, additionally requires that you "attach" a separate lid support as well as various other small components. The HARLEY-DAVIDSON® product requires a fairly lengthy and involved installation. The HARLEY-DAVIDSON® design also omits any specific and unique support mechanisms for the front and rear of the bag as well as the outer edge of the lid.

As can be seen, there is a need for an improved saddlebag support bracket for HARLEY-DAVIDSON® HERITAGE SOFTAIL® motorcycles.

SUMMARY OF THE INVENTION

In one aspect of the present invention, the saddlebag support bracket comprises an in board bike side bracket bar; bike side bracket bar slots which are adapted to align with the existing threaded posts of the motorcycle; rear and front bracket bars extending from opposite ends of the in board bike side bracket bar; rear and front "T-bars" extending from and disposed above each of the rear and front bracket bars; and a lid support rail assembly interconnecting ends of the rear and front bracket bars.

In another aspect of the present invention, the saddlebag support bracket comprises an in board bike side bracket bar; bike side bracket bar slots which are adapted to align with the existing threaded posts of the motorcycle; rear and front bracket bars extending from opposite ends of the in board bike side bracket bar; rear and front T-bars extending from and disposed above each of the rear and front bracket bars; and a lid support rail assembly interconnecting ends of the rear and front bracket bars, wherein a front T-bar support extends away from and above the front of the front bracket bar; a rear T-bar support extends directly above the rear bracket bar; and the lid support rail assembly includes rod bars attached to ends of the rear and front bracket bars and extending above the rear and front bracket bars to support a mid bar above the rear and front bracket bars.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a support bracket which fits and properly supports the stock saddlebags of the HARLEY-DAVIDSON® HERITAGE SOFTAIL® leather saddlebags. Typically, the support brackets are made from a solid steel material to provide bag-specific foundational support members in key areas while allowing the bag to function as originally designed. The support bracket uses specially designed T-bar supports to uniquely and positively reach up underneath the original and existing leather folds designed into the front and rear ends of every factory Heritage bag. The support bracket can be installed quickly, typically within 10 minutes or less. The support bracket requires no motorcycle or saddlebag alterations, no glues, and no product assembly. The support bracket utilizes T-bars at the front and rear ends thereof, along with an outside lid support rail to positively and solidly, yet discretely, contact with parts of the existing and unaltered saddlebag which are outside of view.

Figure 1:
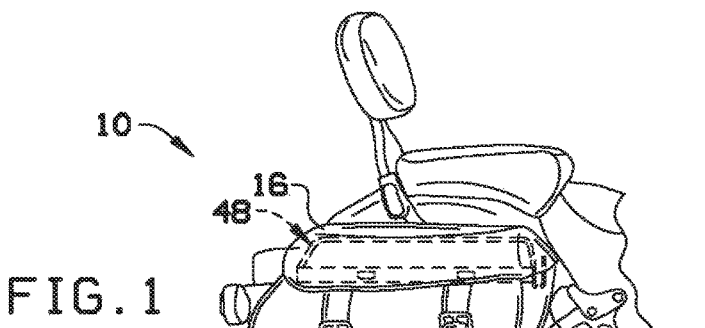
FIG. 1 is a side view of a support bracket installed in a saddlebag according to an exemplary embodiment of the present invention.
Figure 2:
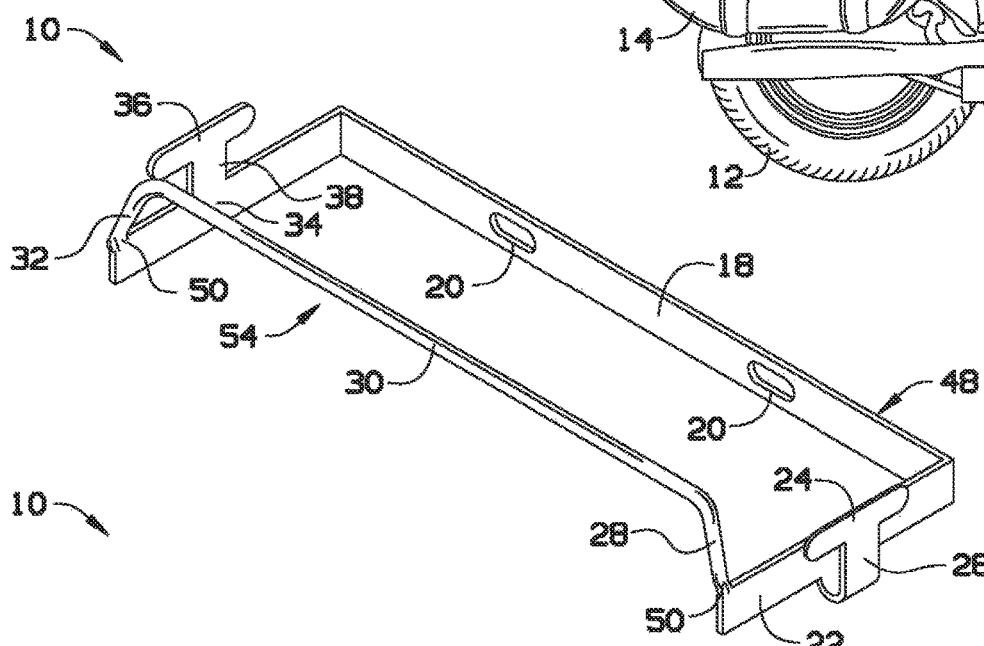
FIG. 2 is a perspective view of the support bracket of FIG. 1.
Figure 3:
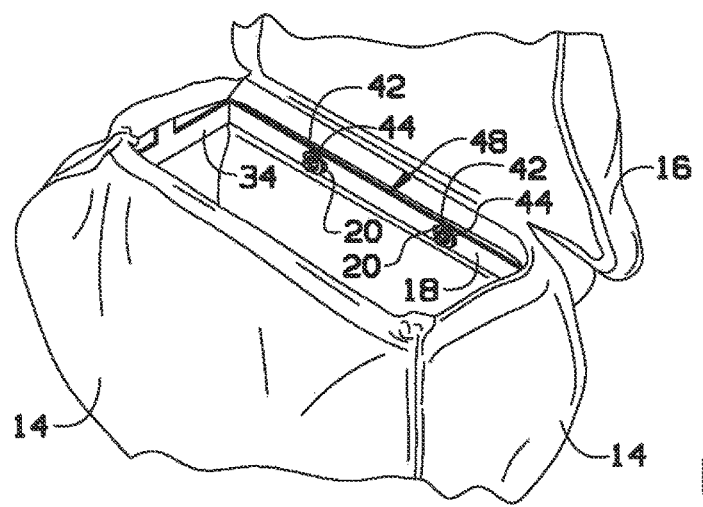
FIG. 3 is a detailed perspective (installed in a saddlebag) view of the support bracket of FIG. 1.
Figure 4:
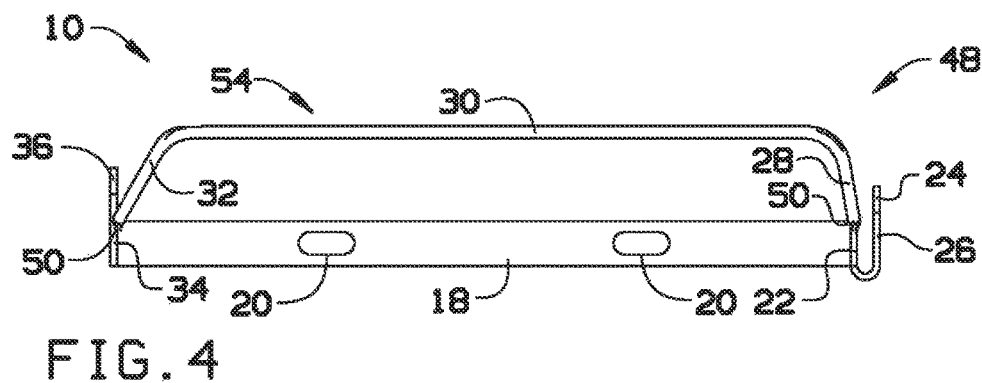
FIG. 4 is a side view of the support bracket of FIG. 1.
Figure 5:
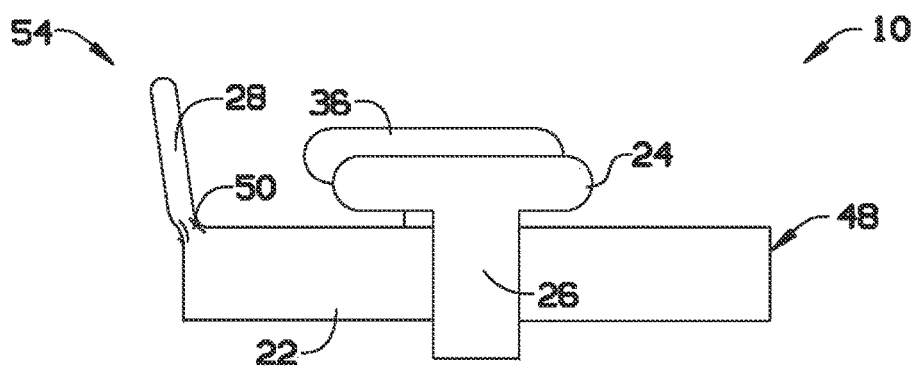
FIG. 5 is a front view of the support bracket of FIG. 1.
Figure 6:
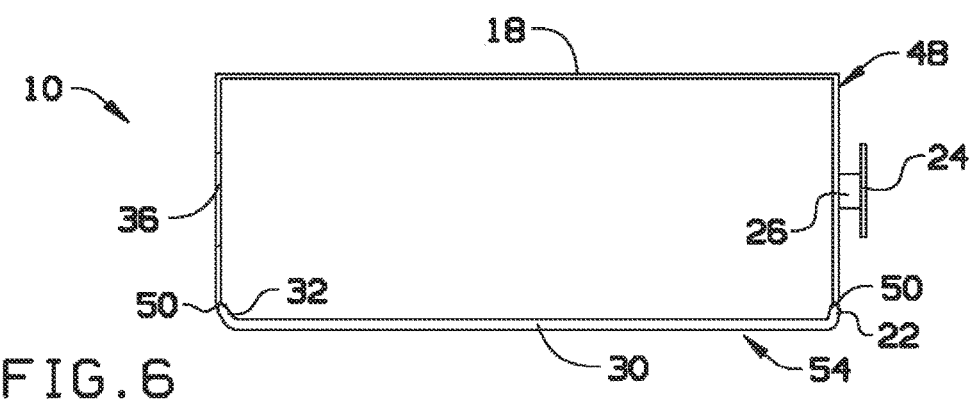
FIG. 6 is a top view of the support bracket of FIG. 1.
Figure 7:
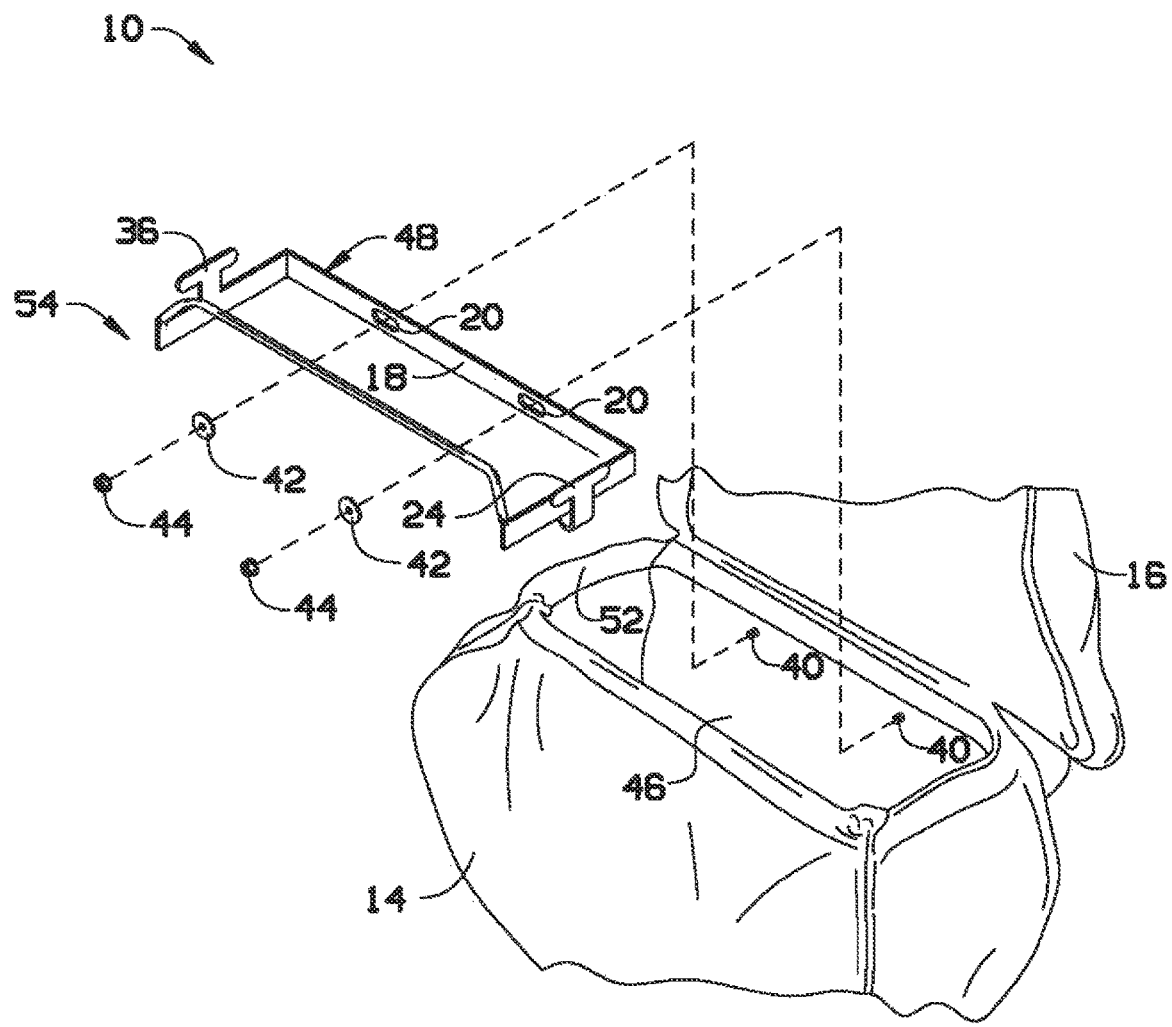
FIG. 7 is an exploded perspective view showing the support bracket of the present invention removed from the saddle bag.

Referring now to FIGS. 1 through 7, a saddlebag support system 10 can include a saddlebag bracket 48 disposed in a saddlebag body 14 that does not change the operation of the saddlebag body 14 and its lid 16. The support system 10 can be designed to specifically fit a HARLEY-DAVIDSON® HERITAGE SOFTAIL® motorcycle 12 from model year 2000 to the present model year.

The saddlebag bracket 48 is typically made of solid steel, for example, and is a one-piece unit. The saddlebag bracket 48 includes an in board bike side bracket bar 18 having two each slots 20 disposed therein. Typically, the bar slots 20 are most accurately cut with lasers. The slots 20 are configured to match with the existing HARLEY® threaded posts 40 of the motorcycle 12. The saddlebag bracket 48 includes a front bracket bar 22 and a rear bracket bar 34 connected to ends of the in board bike side bracket bar 18. A front T-bar support 26 extends outward and upward from the front bracket bar 22 and support a front upper T-bar 24 above a plane of the front bracket bar 22. A rear T-bar support 38 extends upward from the top of the rear bracket bar 34 to support a rear upper T-bar 36.

The T-bars 24, 36, along with the outboard rail (lid support/rod assembly 54) supplies the basis for providing a strong saddlebag support system. The framework of the bracket 48 fits, by design, to not interfere with loading, unloading, or any normal function of the saddlebag, or the owner's use of the bag.

The brackets 48, (two each, left and right side, to create a complete set), are each a mirror image of one another. They accomplish their objectives as they are attached to either side of a motorcycle via the inside of each saddlebag. Once properly installed, they fit inside each bag, and are invisible once the bag lids are shut and buckled.

Each bracket 48 has two "T" shaped supports (T bars 24, 36 on top of T-bar supports 26, 38). These supports fit securely inside the stock, riveted leather lips 52 at the front and rear ends of each stock saddlebag. The brackets 48 can be each made of laser-cut and bent steel and connected with a weld 50 to form a single-piece product. Once installed, these brackets 48 create an environment which forces old, weathered and misshaped bags to resume their original shape, and physical attitude. Additionally, the brackets 48 prevent the sagging that limits the bag capacity and destroys their appearance. The T-bars 24, 36 very importantly accomplish another extremely unique goal—they take the responsibility of supporting the weight of the bag, and any bag contents, away from bag, bag lid and/or straps, and transfer all weight-bearing responsibility to the bracket supports 26, 38 which literally suspend the saddlebag. This transfers all weight directly to the frame of the motorcycle 12. The bracket 48 also includes a unique "rail" (lid support rail assembly 54) that joins the front of the bag support to the rear at the points distal to the motorcycle frame/body. The rod assembly 54 forces the old and badly misshapen bag lid to fall naturally into the original factory position. The entire installation requires only a size ½" wrench or similar tool , and 5-10 minutes per bag. Once the new support brackets are in place, they can be forgotten. No additional pieces, or parts will ever be necessary.

The brackets 48, as described above, are designed to fit inside the saddlebags of the HARLEY-DAVIDSON® HERITAGE SOFTAIL® Classic from the model year 2000 until the current model year. With the bike on the kickstand, the owner of a new set of these brackets will simply loosen and remove the existing HARLEY® factory ½" bag retaining nuts 44 and washers 42 which hold the original saddlebag to the frame of the bike (inside the bag). It may help to install the right-side bracket first. Once the nuts 44 and washers 42 have been removed, the bag can be slid away from the mounting screws until the screws retract into the holes, but the bag is not pulled completely off the screws/ bike. The installed bracket will later be aligned with the holes inside the bag. If the screws are not retracted slightly, they will impede the installation process. Now, the user can simply lower the bracket down into the bag, (in-board or back edge first). Next, the user can lift the bracket up, inside the bag as they carefully, but with mild force (depending on the condition of the bag), slip the before mentioned "uprights" (T-bars 24, 36) underneath the riveted leather folds at front and rear of the bag. Next, the user can lift-up the inboard edge of the bracket until it slips into place and naturally aligns with the interior bag mounting holes. This is most easily accomplished if, as lifted, the user points the outboard edge upward. The uprights will slip underneath the flaps of leather, and then the user can lift the inboard edge up until the screws on the bike frame line-up with the slots cut into the inboard edge of the support bracket. The entire bag assembly can be slid back on the bike, fully extending the mounting screws through the bag holes and the bag bracket support slots. At that point, the user can simply replace the original, HARLEY®-supplied bag attachment nuts and each accompanying support washer. Each nut can be twisted clockwise until satisfactorily tight. At this point, the right side bag support is completely installed.

It should be understood, of course, that the foregoing relates to exemplary embodiments of the invention and that modifications may be made without departing from the spirit and scope of the invention as set forth in the following claims.

What is claimed is:

1. A saddlebag support bracket comprising:
an in board bike side bracket bar;
rear inboard bike side bracket bar slots formed in the in board bike side bracket bar and adapted to align with existing threaded posts on a motorcycle;
a rear and front bracket bar extending from opposite ends of the in board bike side bracket bar, the rear and front bracket bar having a first end attached to the in board bike side bracket bar and a second end opposite the first end, wherein movement along the rear and front bracket bars, from the first end to the second end thereof, is continuously heading away from the in board bike side bracket bar;
rear and front T-bars extending upwardly from and disposed above each of the rear and front bracket bars, wherein each leg of the rear and front T-bars are attached to the rear and front bracket bars and each cross member of the rear and front T-bars are disposed away from the rear and front bracket bars; and
a lid support rail assembly interconnecting the second ends of the rear and front bracket bars.

2. The saddlebag support bracket of claim 1, wherein a front T-bar support extends away from and above the front bracket bar.

3. The saddlebag support bracket of claim 2, wherein a rear T-bar support extends directly above the rear bracket bar and even with a height of the front T-bar.

4. The saddlebag support bracket of claim 1, wherein a rear T-bar support extends directly above the rear bracket bar.

5. The saddlebag support bracket of claim 1, wherein the lid support rail assembly includes rod bars angled from and attached to ends of the rear and front bracket bars and extending above the rear and front bracket bars to support a mid bar above the rear and front bracket bars.

6. The saddlebag support bracket of claim 5, wherein the lid support rail assembly is fabricated from a single piece of material.

7. The saddlebag support bracket of claim 1, wherein the bracket is formed in a single piece.

8. The saddlebag support bracket of claim 1, wherein the bracket requires no modification of the motorcycle or the saddlebag itself.

9. A saddlebag support bracket comprising:
an in board bike side bracket bar;
in board bike side bracket bar slots formed in the in board bike side bracket bar and adapted to align with existing threaded posts on a motorcycle;

a rear and front bracket bar extending from opposite ends of the in board bike side bracket bar, the rear and front bracket bar having a first end attached to the in board bike side bracket bar and a second end opposite the first end, wherein movement along the rear and front bracket bars, from the first end to the second end thereof, is continuously heading away from the in board bike side bracket bar;

rear and front T-bars extending upwardly from and disposed above each of the rear and front bracket bars, wherein each leg of the rear and front T-bars are attached to the rear and front bracket bars and each cross member of the rear and front T-bars are disposed away from the rear and front bracket bars;

a lid support rail assembly interconnecting ends of the rear and front bracket bars, wherein:

a front T-bar support extends away from and above the front bracket bar;

a rear T-bar support extends directly above the rear bracket bar; and the lid support rail assembly includes rod bars attached to the second ends of the rear and front bracket bars and extending above the rear and front bracket bars to support a mid bar above the front and rear bracket bars.

10. The saddlebag support bracket of claim 9, wherein the bracket is formed in a single piece.

11. The saddlebag support bracket of claim 9, wherein the bracket requires no modification of the motorcycle or the saddlebag itself.

* * * * *